United States Patent
Tseng et al.

(10) Patent No.: US 11,185,765 B2
(45) Date of Patent: Nov. 30, 2021

(54) MULTI-FUNCTIONAL NOTEBOOK

(71) Applicants: Hsiao-Wen Tseng, Taipei (TW);
Jyh-Chyang Tzou, Taipei (TW);
Yi-Hsun Liu, Taipei (TW); Yao-Hsien Yang, Taipei (TW)

(72) Inventors: Hsiao-Wen Tseng, Taipei (TW);
Jyh-Chyang Tzou, Taipei (TW);
Yi-Hsun Liu, Taipei (TW); Yao-Hsien Yang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/727,947

(22) Filed: Dec. 27, 2019

(65) Prior Publication Data

US 2020/0206607 A1     Jul. 2, 2020

Related U.S. Application Data

(60) Provisional application No. 62/785,701, filed on Dec. 28, 2018.

(51) Int. Cl.
*A63F 13/24* (2014.01)
*G06F 1/16* (2006.01)
*A63F 13/215* (2014.01)

(52) U.S. Cl.
CPC .......... *A63F 13/24* (2014.09); *A63F 13/215* (2014.09); *G06F 1/169* (2013.01); *G06F 1/1616* (2013.01);
(Continued)

(58) Field of Classification Search
None
See application file for complete search history.

(56) References Cited

U.S. PATENT DOCUMENTS

| 7,656,386 B1* | 2/2010 | Goldbaum .......... G06F 3/03548 |
| | | 345/156 |
| 8,811,024 B2* | 8/2014 | Wei ..................... G06F 3/03547 |
| | | 361/752 |

(Continued)

FOREIGN PATENT DOCUMENTS

| CN | 1849575 | 10/2006 |
| CN | 206363197 | 7/2017 |

(Continued)

OTHER PUBLICATIONS

"Office Action of Taiwan Counterpart Application", dated Jul. 10, 2020, p. 1-p. 5.

(Continued)

*Primary Examiner* — Anthony Q Edwards
*Assistant Examiner* — Rashen E Morrison
(74) *Attorney, Agent, or Firm* — JCIPRNET

(57) ABSTRACT

A multi-functional notebook includes a first body, a processing unit, a second body, and two joysticks. The first body has two accommodating spaces and a first wireless module. The processing unit is disposed in the first body and coupled to the first wireless module, and serves as a control core. The second body is connected to the first body and has a display unit coupled to the processing unit. The two joysticks are detachably disposed in the two accommodating spaces respectively and are coupled to the processing unit. Each of the joysticks has a second wireless module, and the two second wireless modules are coupled to the first wireless module for signal transmission. The processing unit is adapted to detect a connection state between each of the joysticks and the first body to switch to a corresponding operation mode.

10 Claims, 11 Drawing Sheets

(52) U.S. Cl.
CPC .......... *G06F 1/1656* (2013.01); *G06F 1/1688* (2013.01); *G06F 1/1698* (2013.01)

(56) References Cited

U.S. PATENT DOCUMENTS

| | | | | |
|---|---|---|---|---|
| 8,896,559 | B2* | 11/2014 | Goldbaum | .......... G06F 3/04144 345/173 |
| 2006/0152484 | A1* | 7/2006 | Rolus Borgward | ........................ G06F 3/03543 345/157 |
| 2006/0176277 | A1* | 8/2006 | Daniel | .................. G06F 3/0317 345/163 |
| 2008/0270665 | A1* | 10/2008 | Senatori | ................ G06F 1/1671 710/303 |
| 2010/0250975 | A1* | 9/2010 | Gill | ....................... G06F 1/3293 713/300 |
| 2014/0043254 | A1* | 2/2014 | Goldbaum | .......... G06F 3/03547 345/173 |
| 2015/0099505 | A1* | 4/2015 | Kiukkonen | ....... H04M 1/72412 455/419 |
| 2020/0363839 | A1* | 11/2020 | Liu | ....................... G06F 1/1681 |

FOREIGN PATENT DOCUMENTS

| | | |
|---|---|---|
| CN | 207637052 | 7/2018 |
| TW | M331133 | 4/2008 |
| TW | 201019174 | 5/2010 |
| TW | 201232240 | 8/2012 |

OTHER PUBLICATIONS

"Office Action of China Counterpart Application", dated Mar. 1, 2021, pp. 1-10.

* cited by examiner

MULTI-FUNCTIONAL NOTEBOOK

CROSS-REFERENCE TO RELATED APPLICATION

This application claims the priority benefit of U.S. provisional application Ser. No. 62/785,701, filed on Dec. 28, 2018. The entirety of the above-mentioned patent application is hereby incorporated by reference herein and made a part of this specification.

TECHNICAL FIELD

The present invention relates to a notebook computer, and more particularly to a multi-functional notebook capable of switching between a plurality of use modes.

RELATED ART

With the improvements in software and hardware specifications, existing notebook computers are no longer limited to being used in word processing, but instead have been gradually demanded for entertainment purposes such as video/audio playing, gaming and the like. However, the existing notebook computers still rely on keyboards and wired mice for command input and game operations. Moreover, due to size limitations, these notebook computers are usually suitable for single person use and are not favorable for use by many people at the same time. Further, the existing notebook computers may allow multiple players to play a game by an external joystick. However, existing joysticks are usually independent of the notebook computer and have the disadvantage of poor portability.

SUMMARY

The present invention provides a multi-functional notebook in which a plurality of joysticks are combined and each of the joysticks is freely detachable. When each joystick is combined with the multi-functional notebook, the multi-functional notebook switches to a working mode and can provide some control functions; when one of the joysticks is removed, the multi-functional notebook switches to a game mode and can perform wireless control.

The multi-functional notebook of the present invention includes a first body, a processing unit, a second body, and two joysticks. The first body has two accommodating spaces and a first wireless module. The processing unit is disposed in the first body and coupled to the first wireless module, and serves as a control core. The second body is connected to the first body and has a display unit coupled to the processing unit. The two joysticks are detachably disposed in the two accommodating spaces respectively and are coupled to the processing unit. Each of the joysticks has a second wireless module, and the two second wireless modules are coupled to the first wireless module for signal transmission. The processing unit is adapted to detect a connection state between each of the joysticks and the first body to switch to a corresponding operation mode.

Based on the above, in the multi-functional notebook of the present invention, two joysticks are combined and each of the joysticks is freely detachable. When each joystick is combined with the first body, the processing unit switches to a working mode and each joystick can provide some control functions. When one of the joysticks is removed, the processing unit switches to a single player game mode; when the two joysticks are both removed, the processing unit switches to a two player game mode. Therefore, the multi-functional notebook of the present invention achieves single player playing and multi-player playing without the need for an external joystick. When not in use, the two joysticks may be stored in the first body, thereby overcoming the disadvantage of poor portability of existing external joysticks.

DESCRIPTION OF THE EMBODIMENTS

Figure 1A:
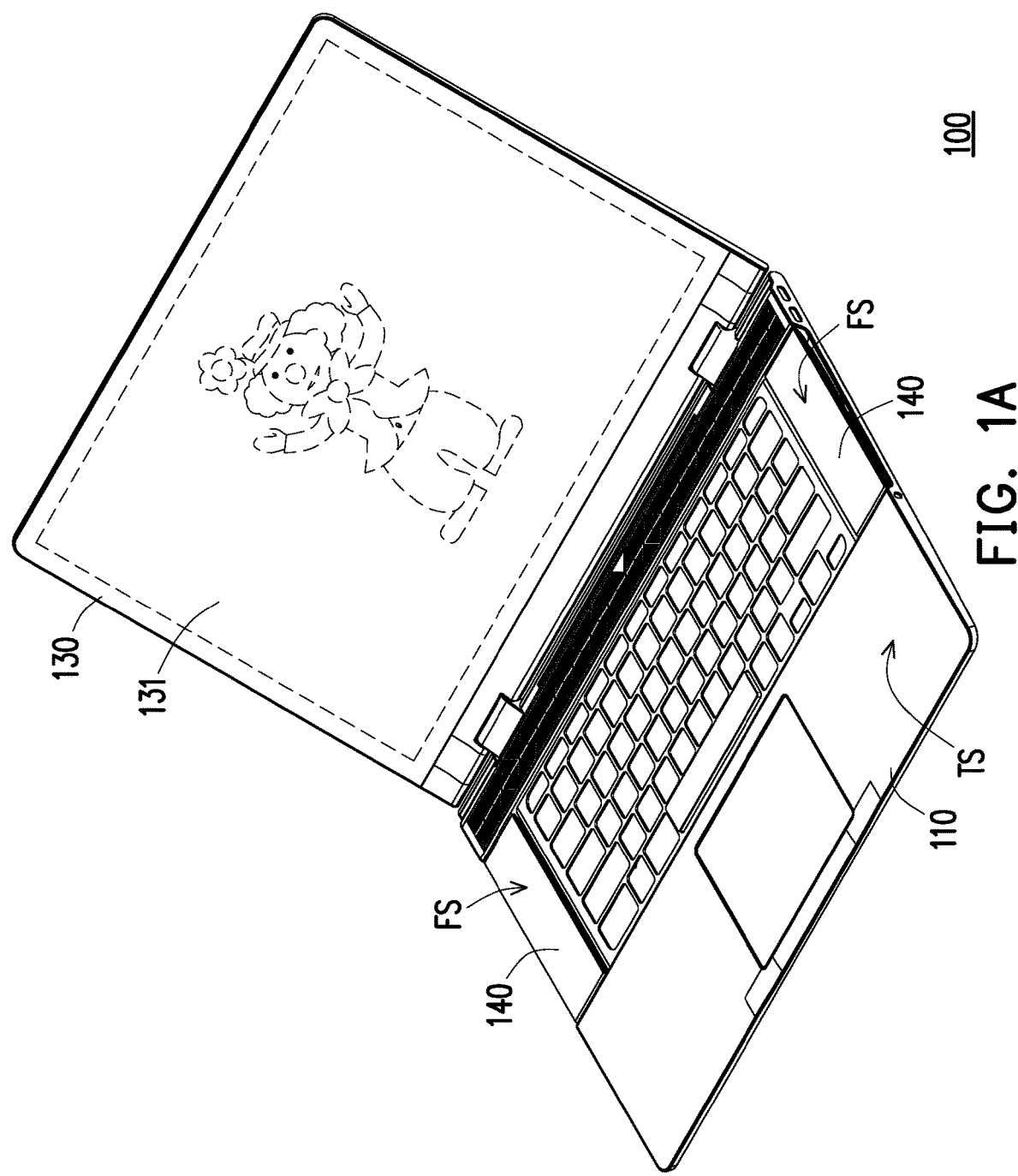
FIG. 1A is a schematic perspective view of a multi-functional notebook according to an embodiment of the present invention.
Figure 1B:
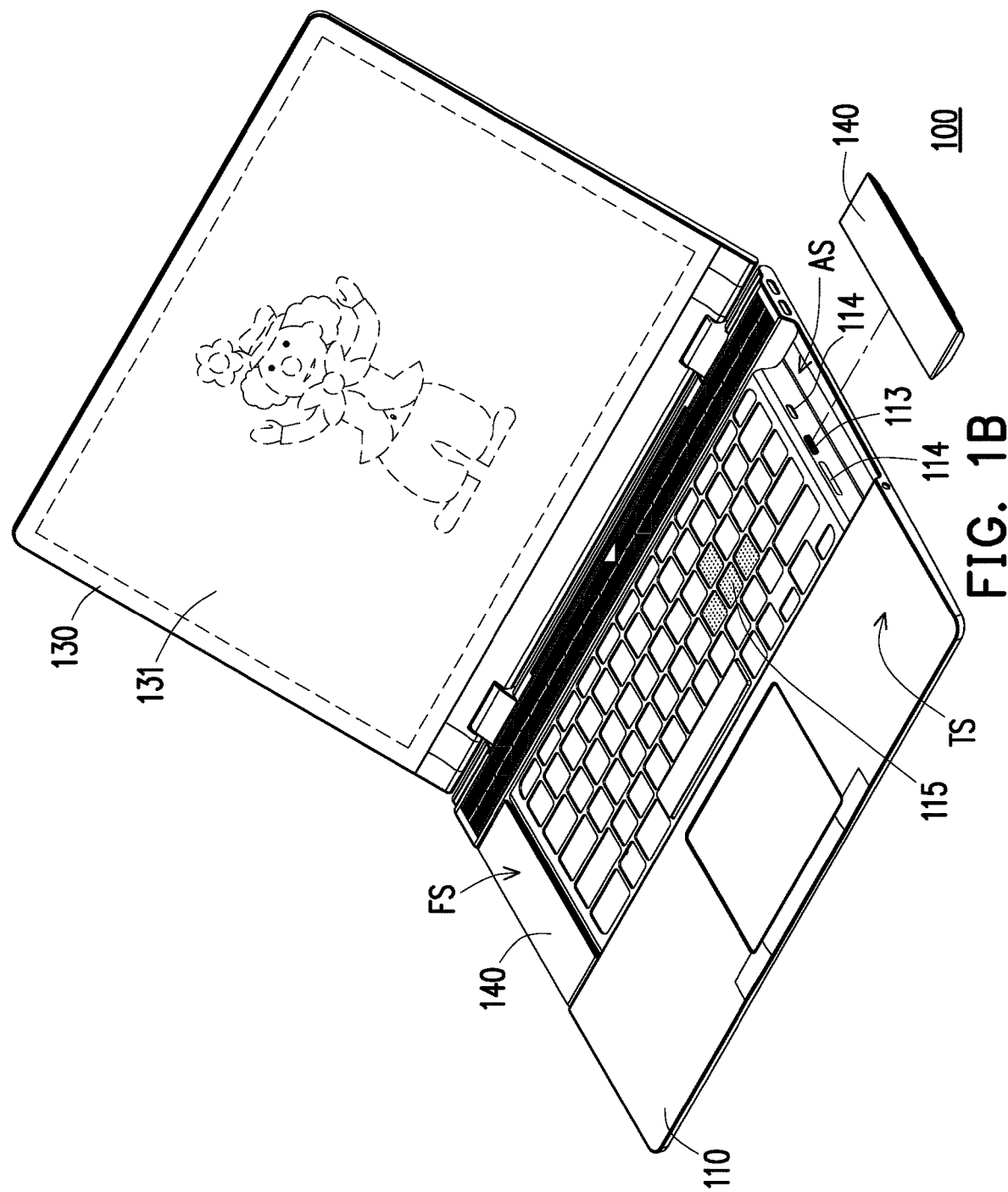
FIG. 1B is a schematic perspective view showing that a right side joystick is separated from a first body in the multi-functional notebook of FIG. 1A.
Figure 1C:
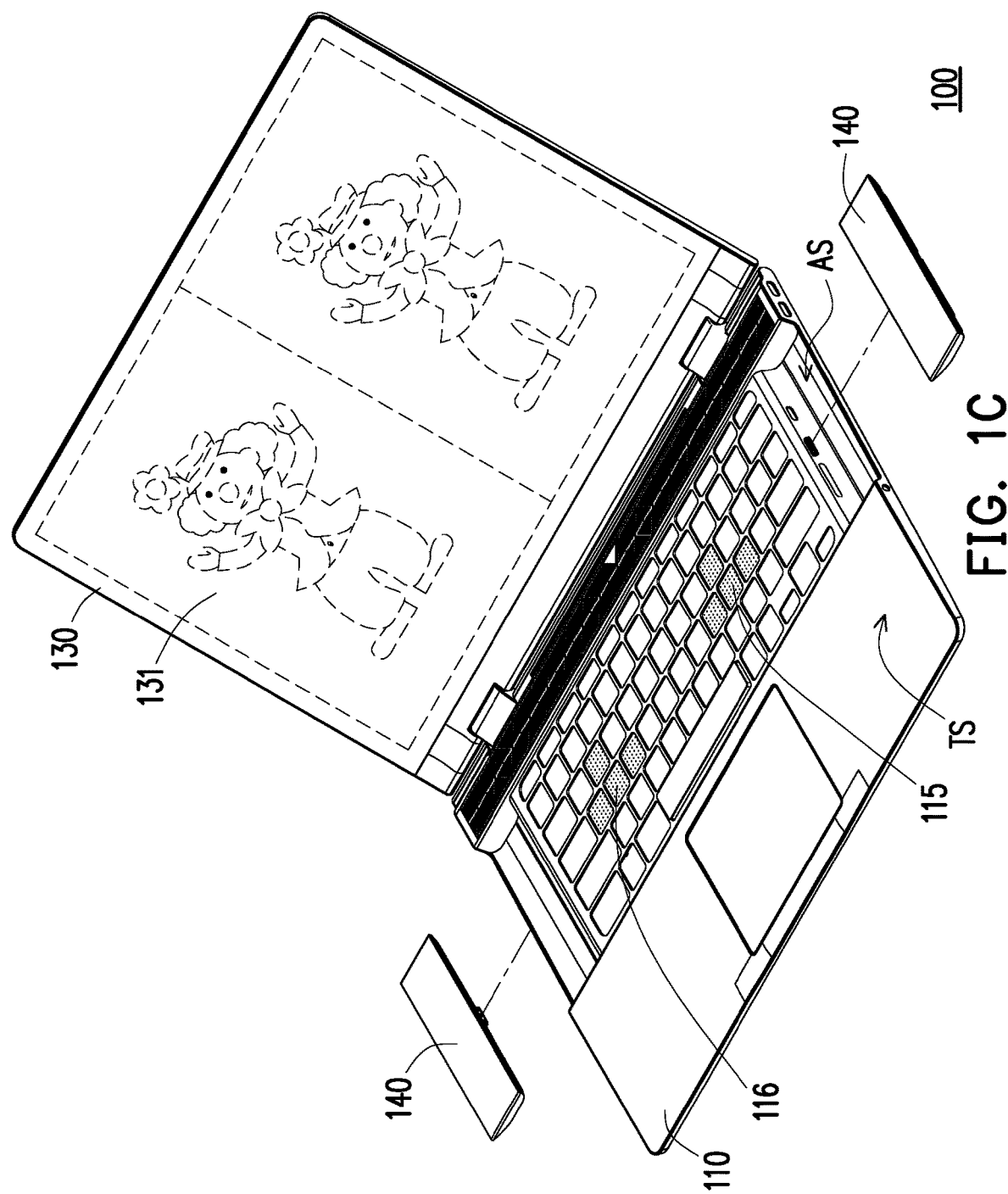
FIG. 1C is a schematic perspective view showing that two joysticks are separated from the first body in the multi-functional notebook of FIG. 1A.
Figure 1D:
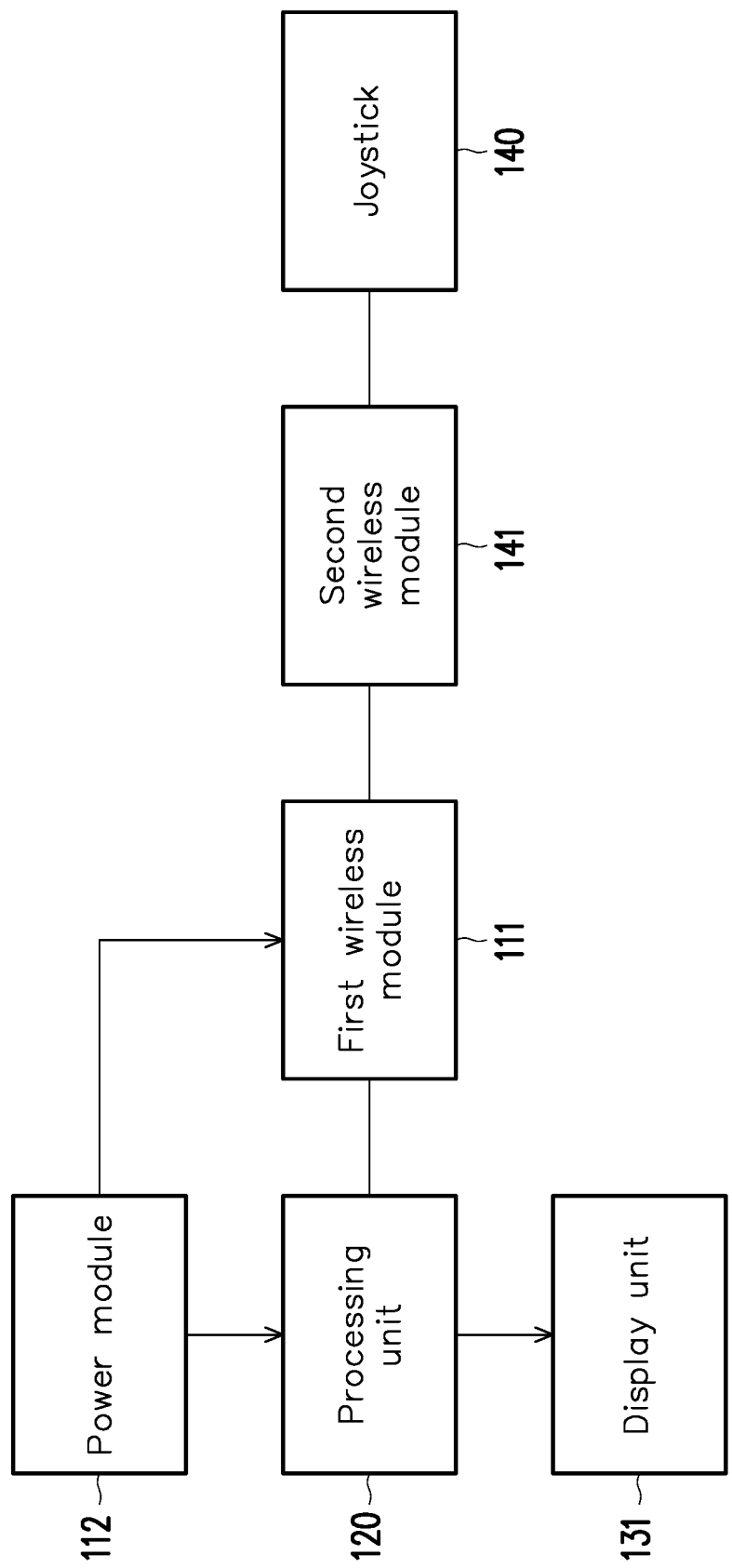
FIG. 1D is a schematic view of circuit blocks of the multi-functional notebook of FIG. 1A.
Figure 1E:
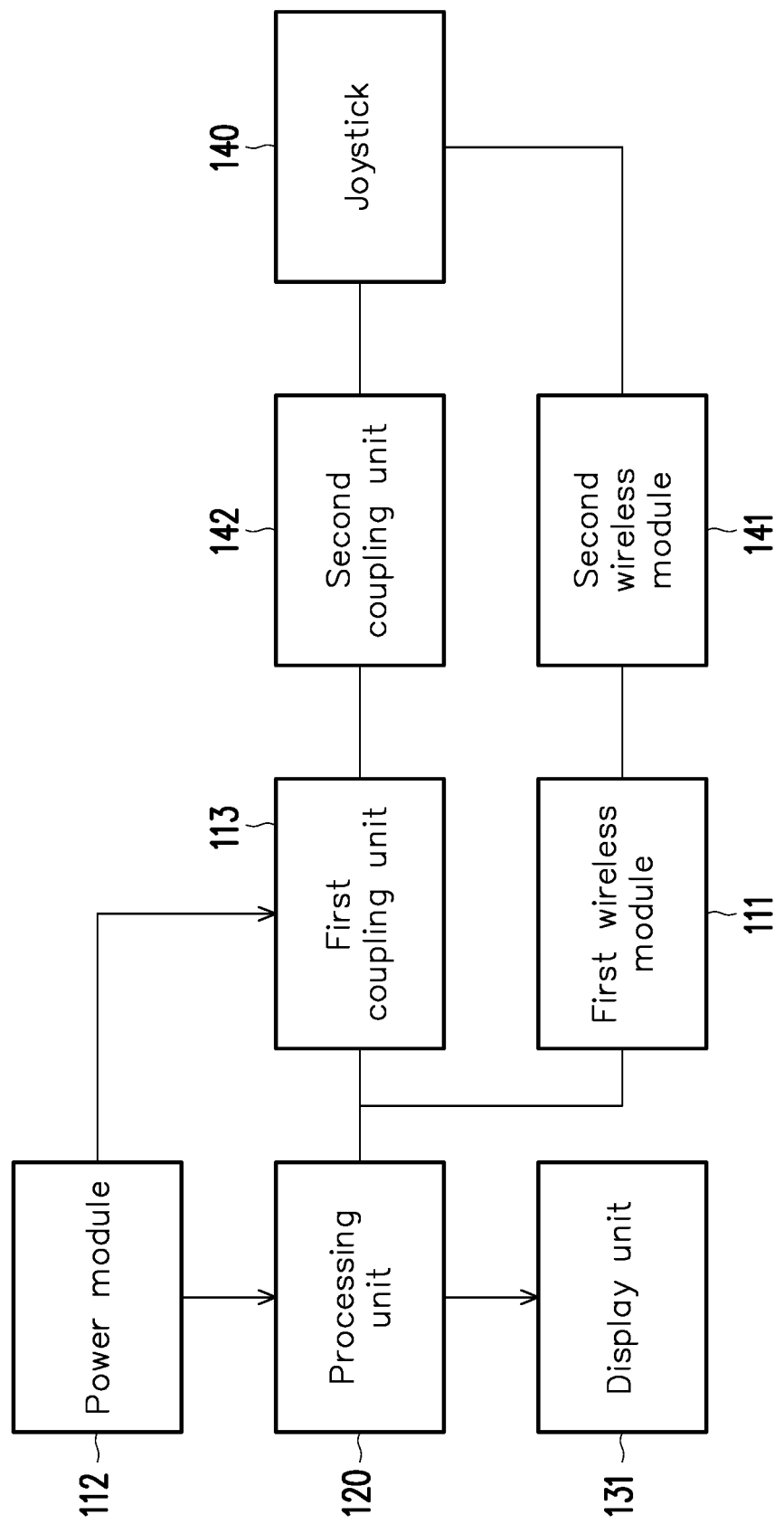
FIG. 1E is a schematic view of circuit blocks of the multi-functional notebook according to another embodiment of FIG. 1A.

FIG. 1A is a schematic perspective view of a multi-functional notebook according to an embodiment of the present invention. FIG. 1B is a schematic perspective view showing that a right side joystick is separated from a first body in the multi-functional notebook of FIG. 1A. FIG. 1C is a schematic perspective view showing that two joysticks are separated from the first body in the multi-functional notebook of FIG. 1A. FIG. 1D is a schematic view of circuit blocks of the multi-functional notebook of FIG. 1A. FIG. 1E is a schematic view of circuit blocks of the multi-functional notebook according to another embodiment of FIG. 1A.

Referring to FIG. 1A, a multi-functional notebook 100 of the present embodiment includes a first body 110, a processing unit 120, a second body 130, and two joysticks 140.

Referring to FIG. 1A, FIG. 1C and FIG. 1D, the first body 110 has two accommodating spaces AS and a first wireless module 111. The two accommodating spaces AS are respectively formed on two opposite sides of the first body 110. The first wireless module 111 is disposed in the first body 110 and uses, for example, Bluetooth, Wi-Fi, or other types of wireless transmission technologies. The first body 110 is used to carry a motherboard, a storage unit, a memory unit and other electronic components.

The processing unit 120 is disposed in the first body 110 and is coupled to the first wireless module 111. The processing unit 120 serves as a control core of the multi-functional notebook 100. In addition, the processing unit 120 is used to perform work such as inputting, outputting and storing a signal, a logic operation and the like.

The second body 130 is connected to the first body 110 and has a display unit 131. The display unit 131 is a display panel or a touch display panel. The display unit 131 is coupled to the processing unit 120 and is used to output a video, an image or the like that has undergone an operation by the processing unit 120. For example, when the multi-functional notebook 100 is running a game or playing a video, image data of the game or the video, after undergoing a logic operation by the processing unit 120, are converted into static images and dynamic videos or animations and output onto the display unit 131.

Referring to FIG. 1A and FIG. 1D, the two joysticks 140 are detachably disposed in the two accommodating spaces AS respectively and are coupled to the processing unit 120. Each joystick 140 has a second wireless module 141. Each second wireless module 141 is coupled to the first wireless module 111 and is used to transmit a signal. Each second wireless module 141 is coupled to the processing unit 120 through the first wireless module 111. Therefore, the two joysticks 140 transmit a control command to the processing unit 120 through wireless transmission, thereby achieving a remote control effect. Each second wireless module 141 is coupled to a power module 112 of the first body 110 through the first wireless module 111. This shows that the first wireless module 111 and the second wireless module 141 have a wireless charging function, and the energy of the power module 112 is transmitted to the two joysticks 140 through inductive coupling. Further, wireless charging can be performed only when the two joysticks 140 are installed in the two accommodating spaces AS, and is limited by distance.

Referring to FIG. 1B and FIG. 1C, the processing unit 120 is adapted to detect a connection state between each joystick 140 and the first body 110 to switch to a corresponding operation mode that includes a working mode, a video/audio mode, a single player game mode, or a two player game mode. However, the number and types of the operation modes are not limited in the present invention.

Figure 2A:
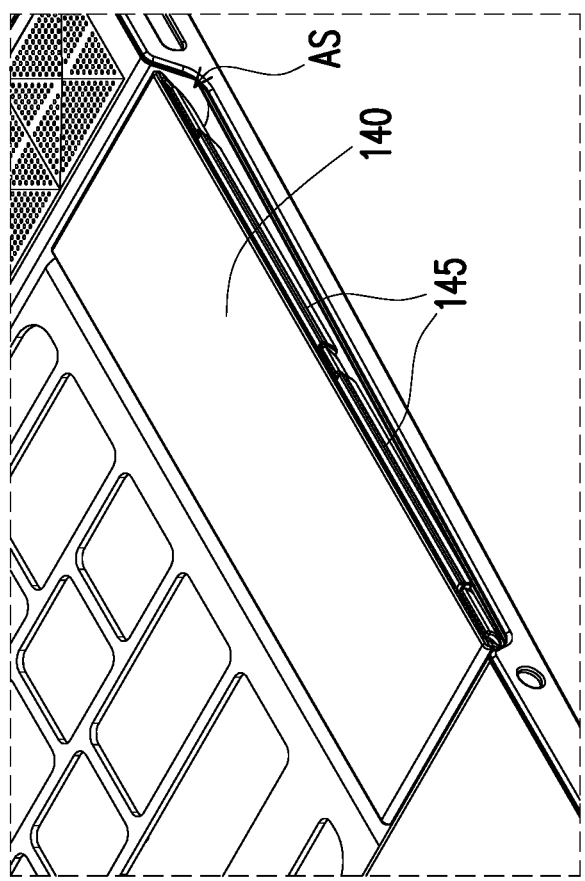
FIG. 2A is a schematic partially enlarged perspective view of the multi-functional notebook of FIG. 1A.
Figure 2B:
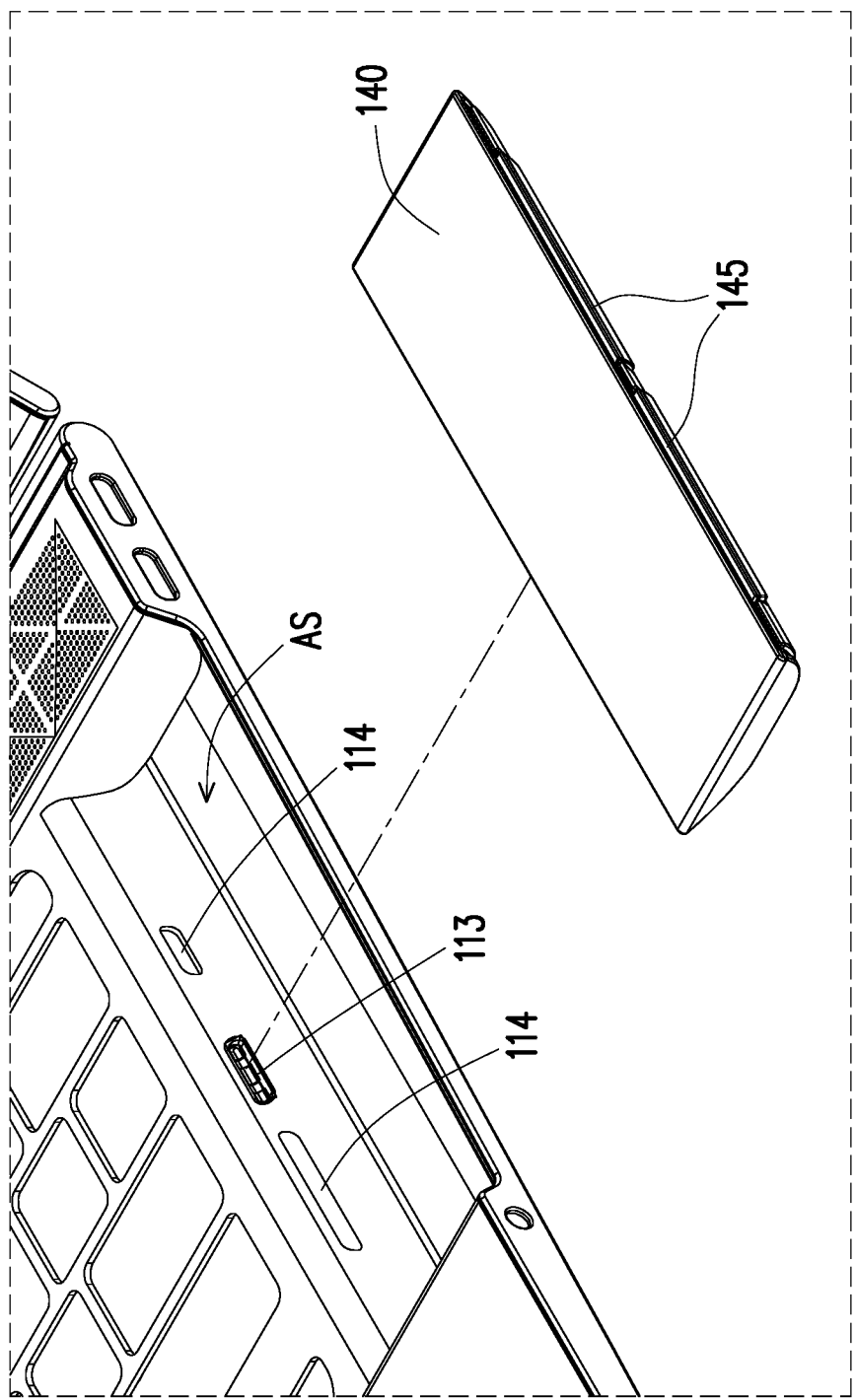
FIG. 2B is a schematic partially enlarged perspective view of the multi-functional notebook of FIG. 1B.
Figure 3A:
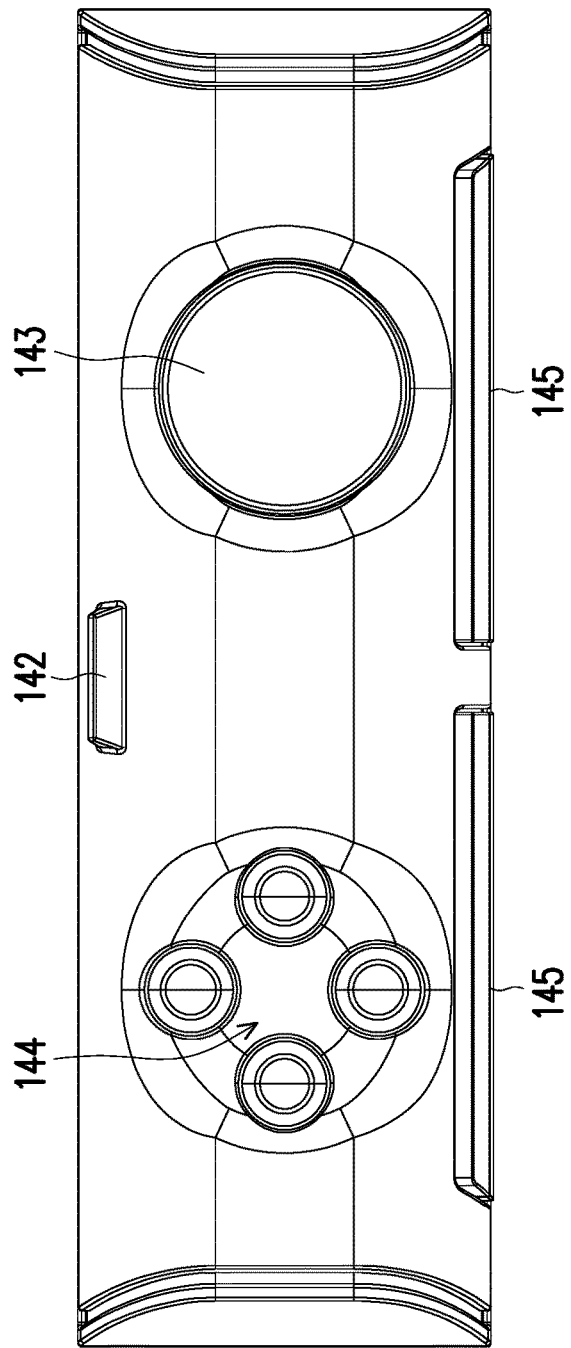
FIG. 3A is a schematic top plan view of a joystick of the multi-functional notebook of FIG. 1A.
Figure 3B:
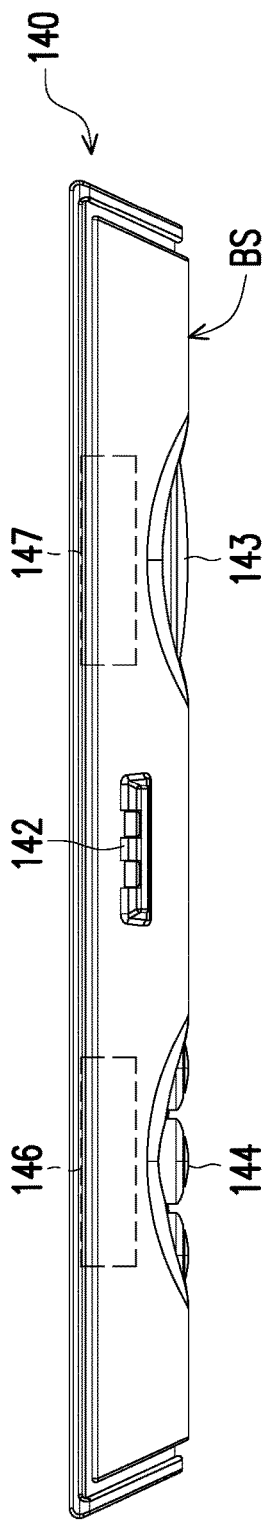
FIG. 3B is a schematic front plan view of a joystick of the multi-functional notebook of FIG. 1B.

FIG. 2A is a schematic partially enlarged perspective view of the multi-functional notebook of FIG. 1A. FIG. 2B is a schematic partially enlarged perspective view of the multi-functional notebook of FIG. 1B. FIG. 3A is a schematic top plan view of a joystick of the multi-functional notebook of FIG. 1A. FIG. 3B is a schematic front plan view of a joystick of the multi-functional notebook of FIG. 1B.

Referring to FIG. 1E, FIG. 2A and FIG. 2B, the first body 110 has two first coupling units 113 respectively located in the two accommodating spaces AS. Each joystick 140 has a second coupling unit 142 (see FIG. 3A and FIG. 3B). Each second coupling unit 142 is disposed in each first coupling unit 113 and is coupled to the processing unit 120 and the power module 112 of the first body 110. Each second coupling unit 142 is coupled to the power module 112 of the first body 110 through the first coupling unit 113, and transmits the energy of the power module 112 to the two joysticks 140 through line transmission.

Further, in the present embodiment, the first coupling unit 113 is a female connector and the second coupling unit 142 is a male connector, or the first coupling unit 113 is a male connector and the second coupling unit 142 is a female connector. The present invention is not limited thereto.

Referring to FIG. 2B, the first body 110 includes a plurality of expansion ports 114 respectively located in the two accommodating spaces AS for installation of an external storage device such as a solid state hard disk or a flash memory. This makes it easy for a user to expand memory space or exchange data.

Referring to FIG. 3A and FIG. 3B, each joystick 140 has a direction key 143, a plurality of function keys 144, and two adjusting keys 145. The direction key 143 and the plurality of function keys 144 are disposed on a bottom surface BS of each joystick 140.

When the processing unit 120 switches to the video/audio mode and an arbitrary one of the two joysticks 140 is separated from the first body 110, the two adjusting keys 145 of each joystick 140 are used to adjust the volume, and the plurality of function keys 144 of each joystick 140 include functions such as playing, fast forwarding, rewinding, pausing and the like. At this time, the joystick 140 separated from the first body 110 serves as a video/audio controller.

Referring to FIG. 1A, FIG. 2A, and FIG. 3A, when the joystick 140 is combined with the first body 110, the two adjusting keys 145 of the joystick 140 are located on an outer edge of the first body 110, and the two adjusting keys 145 serve as volume adjusting keys or other function keys. In detail, when each joystick 140 is installed in each accommodating space AS, a smooth surface FS of each joystick is flush with an upper surface TS of the first body 110 to hide the direction key 143 and the plurality of function keys 144 in the corresponding accommodating space AS, so as to achieve a beautiful appearance.

Figure 4A:
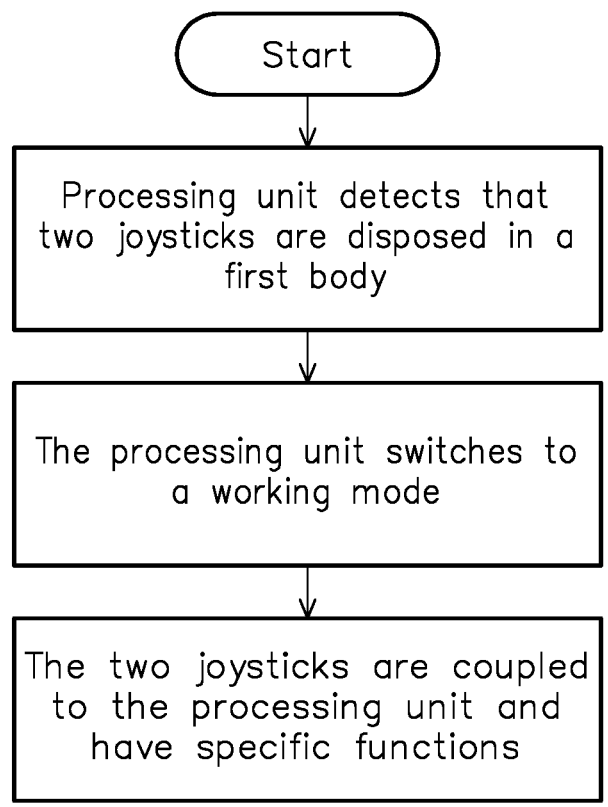
FIG. 4A is a flowchart of switching a multi-functional notebook to a working mode.
Figure 4B:
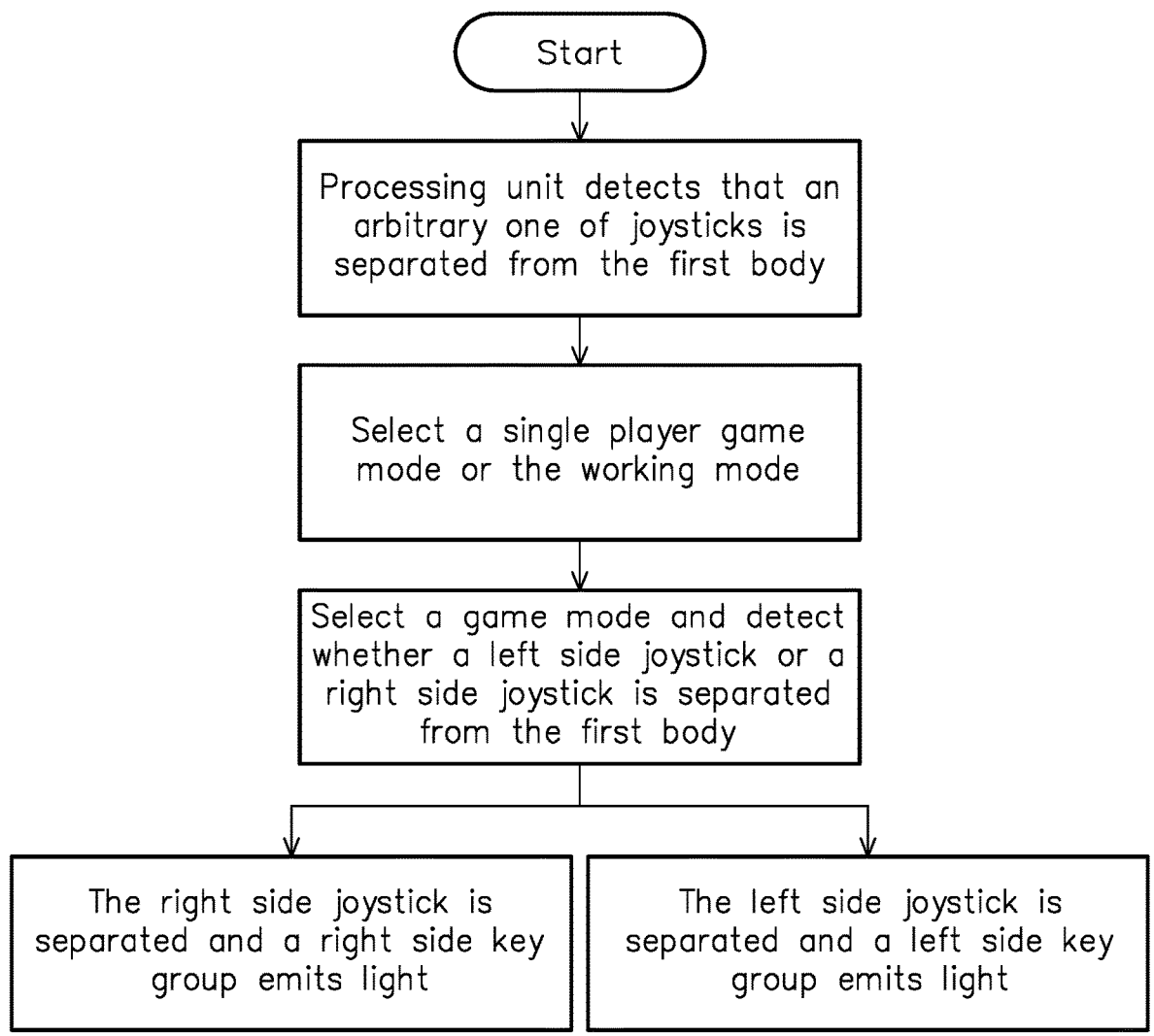
FIG. 4B is a flowchart of switching a multi-functional notebook to a single player game mode.
Figure 4C:
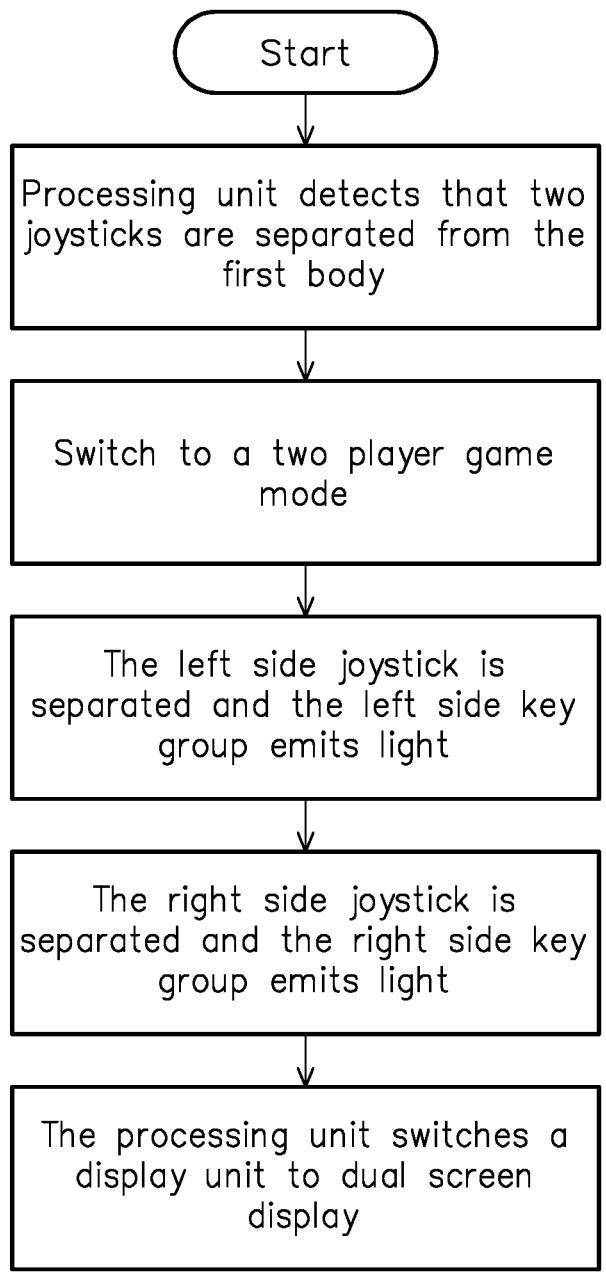
FIG. 4C is a flowchart of switching a multi-functional notebook to a two player game mode.

FIG. 4A is a flowchart of switching a multi-functional notebook to a working mode. FIG. 4B is a flowchart of switching a multi-functional notebook to a single player game mode. FIG. 4C is a flowchart of switching a multi-functional notebook to a two player game mode.

Referring to FIG. 1A and FIG. 4A, when the two joysticks 140 are respectively disposed in the two accommodating spaces AS of the first body 110, according to signal strength of the first wireless module 111 or the second wireless module 141 or the fact that each second coupling unit 142 and each first coupling unit 113 are coupled to each other, the processing unit 120 determines that the two joysticks 140 are located in the two accommodating spaces AS. At this time, the processing unit 12 switches to the working mode.

In other embodiments, the first body 110 further includes two pressure sensors. When each joystick 140 is disposed in each accommodating space AS, the corresponding pressure sensor is squeezed and outputs a pressure value to the processing unit 120. In this situation, the processing unit 120 determines that each joystick 140 and the first body 110 are combined with each other. When each joystick 140 is separated from each accommodating space AS, the corresponding pressure sensor is no longer squeezed, and the pressure value decreases. The processing unit 120 determines that each joystick 140 is separated from each accommodating space AS according to a change in the pressure value.

Referring to FIG. 1B and FIG. 4B, when the processing unit 120 detects that an arbitrary one of the two joysticks 140 is separated from the first body 110, the processing unit 120 switches to the working mode or the single player game mode. In detail, when the user removes one of the joysticks 140, the processing unit 120 detects that one of the joysticks 140 is removed according to the fact that the signal strength of the first wireless module 111 and the corresponding second wireless module 141 decreases or that each second coupling unit 142 and each first coupling unit 113 are disconnected from each other. At this time, the user may choose to switch to the single player game mode or the working mode.

If the working mode is selected, the separated joystick 140 only serves as a remote controller.

If the single player game mode is selected, the processing unit 120 further detects whether the joystick 140 located on the left or right is separated from the first body 110. The processing unit 120 is adapted to detect whether the arbitrary one of the joysticks 140 is located on the left or right of the first body 110. When it is determined that the joystick 140 on the right is in the separated state, a right side key group 115 of the first body 110 emits bright light and is used to control a direction (see FIG. 1B). When it is determined that the joystick 140 on the left is in the separated state, a left side key group 116 of the first body 110 emits bright light and is used to control the direction.

Referring to FIG. 1C and FIG. 4C, when the processing unit 120 detects that the two joysticks 140 are both separated from the first body 110, the processing unit 120 switches to the two player game mode. In detail, according to the fact that the signal strength of the first wireless module 111 and the two second wireless modules 141 decreases or that the two second coupling units 142 and the two first coupling units 113 are disconnected from each other, the processing unit 120 determines that the two joysticks 140 are both separated from the first body 110.

In the two player game mode, the two joysticks 140 are both separated from the first body 110, and the right side key group 115 and the left side key group 116 of the first body 110 emit bright light at the same time and are used to control the direction. In addition, the processing unit 120 is adapted to switch the display unit 131 to dual screen display. This makes it easy for two users to watch their respective dedicated game screens.

Referring to FIG. 2A, FIG. 2B, and FIG. 3B, each joystick 140 further includes a microphone 146 and a speaker 147. The microphone 146 is adapted to convert analog audio into an electronic signal, and the speaker 147 is adapted to convert an electronic signal into analog audio. In the single player game mode or the two player game mode, the user holds the joystick 140 and communicates with an online teammate through the microphone 146. In the working mode, each joystick 140 is installed on the first body 110, the microphone 146 serves as a sound receiving or recording component, and the speaker 147 serves as an audio playback component.

In summary, in the multi-functional notebook of the present invention, two joysticks are combined and each of the joysticks is freely detachable. When each joystick is combined with the first body, the processing unit switches to the working mode and each joystick can provide some control functions. When one of the joysticks is removed, the processing unit switches to the single player game mode; when the two joysticks are both removed, the processing unit switches to the two player game mode. Therefore, the multi-functional notebook of the present invention achieves single player playing and multi-player playing without the need for an external joystick. When not in use, the two joysticks may be stored in the first body, thereby overcoming the disadvantage of poor portability of existing external joysticks.

What is claimed is:

1. A multi-functional notebook, comprising:
    a first body, having two accommodating spaces and a first wireless module;
    a processing unit, disposed in the first body and coupled to the first wireless module, serving as a control core;
    a second body, connected to the first body and having a display unit, the display unit being coupled to the processing unit; and
    two joysticks, detachably disposed in the two accommodating spaces respectively and coupled to the processing unit, each of the joysticks having a second wireless module, the second wireless modules and the first wireless module being coupled to each other for signal transmission,
    wherein the processing unit is adapted to detect a connection state between each of the joysticks and the first body to switch to a corresponding operation mode,
    when the processing unit detects that an arbitrary one of the two joysticks is separated from the first body, the processing unit switches to a working mode, a single player game mode, or a video/audio mode, and when the processing unit detects that the two joysticks are both separated from the first body, the processing unit switches to a two player game mod;
    wherein in the single player game mode, the processing unit is adapted to detect whether the arbitrary one of the joysticks is located on the left or the right of the first body, when it is determined that the joystick on the right is in a separated state, a right side key group of the first body emits bright light and is used to control a direction, and when it is determined that the joystick on the left is in the separated state, a left side key group of the first body emits bright light and is used to control the direction.

2. The multi-functional notebook according to claim 1, wherein the first body has two first coupling units respectively located in the two accommodating spaces, each of the joysticks has a second coupling unit, and each of the second coupling units is disposed in each of the first coupling units to be coupled to the processing unit and a power module of the first body.

3. The multi-functional notebook according to claim 1, wherein each of the second wireless modules is coupled to the processing unit and a power module of the first body through the first wireless module.

4. The multi-functional notebook according to claim 1, wherein when the joysticks are respectively disposed in the accommodating spaces, the processing unit switches to a working mode.

5. The multi-functional notebook according to claim 1, wherein in the two player game mode, the two joysticks are both separated from the first body, a right side key group and a left key group of the first body emit bright light at the same time and are used to control a direction, and the processing unit is adapted to switch the display unit to dual screen display.

6. The multi-functional notebook according to claim 1, wherein each of the joysticks has a direction key, a plurality of function keys, and two adjusting keys.

7. The multi-functional notebook according to claim 6, wherein when the processing unit switches to the video/audio mode, the two adjusting keys of each of the joysticks are used to adjust volume, and the plurality of function keys of each of the joysticks comprise functions such as playing, fast forwarding, rewinding, pausing and the like.

8. The multi-functional notebook according to claim 6, wherein when each of the joysticks is installed in each of the accommodating spaces, a smooth surface of the each of the joysticks is flush with an upper surface of the first body to hide the direction key and the plurality of function keys in the corresponding each of the accommodating spaces.

9. The multi-functional notebook according to claim 1, wherein each of the joysticks further comprises a microphone and a speaker, the microphone is adapted to convert analog audio into an electronic signal, and the speaker is adapted to convert an electronic signal into analog audio.

10. The multi-functional notebook according to claim 1, wherein the first body comprises a plurality of expansion ports respectively located in the two accommodating spaces for installation of a storage device such as a solid state hard disk or a flash memory.

* * * * *